United States Patent
Fujisawa et al.

(10) Patent No.: US 7,394,563 B2
(45) Date of Patent: Jul. 1, 2008

(54) IMAGE FORMING APPARATUS THAT EXECUTES AN IMAGE TRIMMING PROCESS WITH PRIORITY OVER OTHER COMMANDS, METHOD THEREFOR, AND STORAGE MEDIUM STORING A PROGRAM THEREFOR

(75) Inventors: Jun Fujisawa, Tokyo (JP); Seiji Ohmori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 878 days.

(21) Appl. No.: 10/602,119

(22) Filed: Jun. 23, 2003

(65) Prior Publication Data
US 2004/0008356 A1 Jan. 15, 2004

(30) Foreign Application Priority Data
Jun. 24, 2002 (JP) .............................. 2002/183548
Jun. 16, 2003 (JP) .............................. 2003/170861

(51) Int. Cl.
*G06F 15/00* (2006.01)
(52) U.S. Cl. ...................... 358/1.2; 358/1.16; 358/1.18; 358/1.9; 382/295; 382/296; 382/298
(58) Field of Classification Search ................. 358/1.2, 358/1.16, 1.18, 1.9; 382/295, 296, 298
See application file for complete search history.

(56) References Cited

U.S. PATENT DOCUMENTS

| | | | | |
|---|---|---|---|---|
| 4,667,248 A | * | 5/1987 | Kanno | 358/452 |
| 5,353,388 A | * | 10/1994 | Motoyama | 358/1.18 |
| 5,485,568 A | * | 1/1996 | Venable et al. | 715/500 |
| 5,511,156 A | * | 4/1996 | Nagasaka | 358/1.1 |
| 5,768,489 A | * | 6/1998 | Adachi et al. | 358/1.18 |
| 5,978,563 A | * | 11/1999 | Kawamoto et al. | 358/1.17 |
| 6,557,017 B1 | * | 4/2003 | Venable | 715/502 |
| 6,624,910 B1 | * | 9/2003 | Koh et al. | 358/1.18 |
| 6,671,064 B2 | * | 12/2003 | Rumph et al. | 358/1.15 |
| 6,822,765 B1 | * | 11/2004 | Ohmori | 358/474 |
| 7,046,385 B2 | * | 5/2006 | Mori et al. | 358/1.15 |
| 2001/0032218 A1 | * | 10/2001 | Huang | 707/513 |
| 2002/0019833 A1 | * | 2/2002 | Hanamoto | 707/500 |
| 2002/0036788 A1 | * | 3/2002 | Hino | 358/1.11 |
| 2002/0085767 A1 | * | 7/2002 | Epstein et al. | 382/246 |
| 2003/0005045 A1 | * | 1/2003 | Tanimoto | 709/203 |

OTHER PUBLICATIONS

U.S. Appl. No. 09/713,303, filed Nov. 16, 2000.

* cited by examiner

*Primary Examiner*—Twyler L. Haskins
*Assistant Examiner*—Jacky X Zheng
(74) *Attorney, Agent, or Firm*—Fitzpatrick, Cella, Harper & Scinto

(57) ABSTRACT

An image forming apparatus processes data described in a predetermined descriptive language. A module interprets a storage location of image data of an image described according to the predetermined descriptive language and a module obtains the image data based on the interpreted storage location. A reading module reads and obtains image forming information that includes image trimming information. Another module interprets the image forming information obtained by the reading module, including interpreting the image trimming information. A processing module renders an image forming processing, including a trimming processing, on the image data based on the interpreted image forming information, and the trimming processing is executed prior to execution of any of a flipping processing, a rotation processing, and an image aspect ratio maintaining processing.

27 Claims, 15 Drawing Sheets

```
<?xml version="1.0"?>
<svg>
    <image xlink:href="image.jpeg"
        width="100" height="100"
    </image>
</svg>
```

```
<?xml version="1.0"?>
<svg>
    <image xlink:href="image.jpeg"
        width="100" height="100"
        ximage:rotate="45">
        <!-- Rotate image 45 degrees -->
    </image>
</svg>
```

```
<?xml version="1.0"?>
<svg>
    <image xlink:href="image.jpeg"
        width="100" height="100"
        ximage:crop="25 10 30 30">
        <!-- Designate image trimming range -->
    </image>
</svg>
```

```
<?xml version="1.0"?>
<svg>
    <image xlink:href="image.jpeg"
        width="100" height="100"
        ximage:flip="horizontal">
        <!--Horizontally flip image -->
    </image>
</svg>
```

[Designation of flip direction]

non: Do not flip
horizontal: Flip in horizontal direction (right-left flipping)
vertical: Flip in vertical direction (up-down flipping)

Fig. 10 (a)

```
<?xml version="1.0"?>
<svg>
    <image xlink:href="image.jpeg"
        width="100" height="100"
        ximage:fit="xMidYMid meet">
        <!-- Designate to maintain image aspect ratio -->
    </image>
</svg>
```

Fig. 10 (b)

[Designation of arrangement]

non: Image and display rectangle to be matched without maintaining aspect ratio
xMinYMin: Left upper ends of image and display rectangle to be aligned while maintaining aspect ratio
xMidYMin: Left-right center upper ends of image and display rectangle to be aligned while maintaining aspect ratio
xMaxYMin: Right upper ends of image and display rectangle to be aligned while maintaining aspect ratio
xMinYMid: Up-down center left ends of image and display rectangle to be aligned while maintaining aspect ratio
xMidYMid: Centers of image and display rectangle to be aligned while maintaining aspect ratio
xMaxYMid: Up-down center right ends of image and display rectangle to be aligned while maintaining aspect ratio
xMinYMax: Left lower ends of image and display rectangle to be aligned while maintaining aspect ratio
xMidYMax: Left-right center lower ends of image and display rectangle to be aligned while maintaining aspect ratio
xMaxYMax: Right lower ends of image and display rectangle to be aligned while maintaining aspect

[Designation of margin]

meet: Display the entire image (blank margin is created)
slice: Display without any blank margin (A portion of image may not be displayed)

Fig. 10 (c)

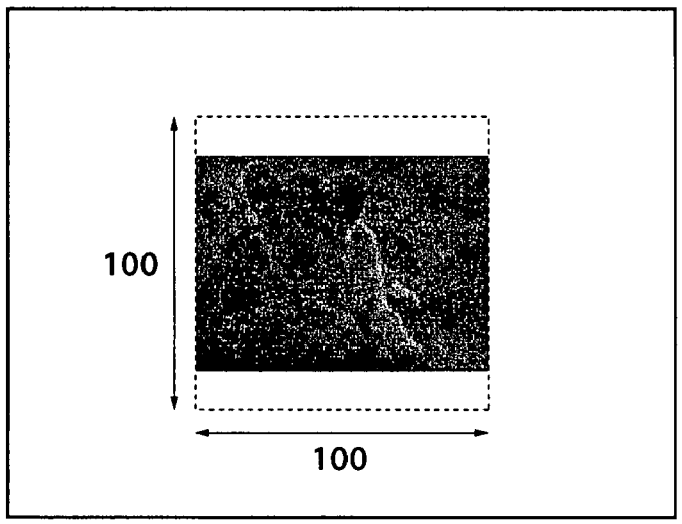

```
<?xml version="1.0"?>
<svg>
    <image xlink:href="image.jpeg"
        width="100" height="100"
        ximage:crop="25 10 30 30"
        <!--   Designate image trimming range   -->
        ximage:flip="horizontal"
        <!-- Horizontally flip image -->
        ximage:rotate="45"
        <!-- Rotate image 45 degrees   -->
        ximage:fit="xMidYMid meet"
        <!--Designate to maintain image aspect ratio -->
    </image>
</svg>
```

Fig. 15

```
<?xml version="1.0"?>
<svg>
    <image xlink:href=""
        width="100" height="100"
        ximage:rotate="45">
        <!-- Rotate image 45 degrees -->
    </image>
</svg>
```

IMAGE FORMING APPARATUS THAT EXECUTES AN IMAGE TRIMMING PROCESS WITH PRIORITY OVER OTHER COMMANDS, METHOD THEREFOR, AND STORAGE MEDIUM STORING A PROGRAM THEREFOR

BACKGROUND OF THE INVENTION

1. Field of the Invention

The present invention relates to image forming apparatuses, image forming methods, image forming programs, storage media for storing image forming programs, and more particularly, to image forming apparatuses, methods and programs in which placement information of images can be designated, as well as storage media that store image forming programs.

2. Related Background Art

In recent years, the technology that describes documents including texts and images with a descriptive language, which may be represented by HTML (Hyper Text Markup Language), has been put into practical use, and widely used as a standard method to describe WWW (World Wide Web) pages on the Internet. The descriptive language is normally equipped with a function to dispose image files on documents through external reference. For example, in the case of the HTML, an image can be displayed through designating the storage location and image size of an image file by an IMG (image) element.

By using the function described above, some image forming applications and systems that have appeared use a descriptive language as a description format when creating electronic albums for browsing a plurality of images. One of such image forming systems automatically generates an image browsing function. More specifically, the system automatically generates an HTML file that provides a display function for browsing images that have been captured by a digital camera, such that the images can be readily browsed by a general internet browsing software without having to use a specialized application.

However, the above-described image forming system that uses a description format in a descriptive language can only designate a placement of an image that is limited to a position and size of each rectangular display region for displaying the image. Therefore, the conventional image forming system is substantially inferior in its power of expression compared to special applications for creating electronic albums that can designate a wide variety of image renderings such as image rotation, trimming and the like.

SUMMARY OF THE INVENTION

The present invention has been made in view of the problems described above, and relates to image forming apparatuses, methods and programs with which images can be drawn with a rich power of expression, and storage media that store the programs.

To realize at least one of various features of the present invention, an image forming apparatus in accordance with an embodiment of the present invention includes a reading module that reads placement information of an image including a storage location of image data of the image, a size of the image and forming information of the image described in a predetermined descriptive language. Also included is an image storage location interpretation module that interprets a storage location of the image, an image size interpretation module that interprets a size of the image that is read, and an image data obtaining module that obtains the image data based on the storage location of the image data interpreted. In addition, included is an image region determining module that determines an image forming rectangular region based on the image size interpreted, an image modification processing module that performs an enlargement/reduction processing on the image data obtained such that the image obtained can be contained in the image forming rectangular region, and an image drawing module that draws the image with the enlargement/reduction processing being rendered in the image forming rectangular region. Also included an image forming information interpreting module that interprets the image forming information obtained, wherein the image modification processing module includes an image forming processing module that performs an image forming processing on the image data based on the image forming information interpreted.

Other features and advantage of the present invention will be apparent from the following description taken in conjunction with the accompanying drawings in which like reference characters designate the same or similar parts throughout thereof.

BRIEF DESCRIPTION OF THE DRAWINGS

FIGS. 6(a) and 6(b) are explanatory views for describing a first description example of image placement information to be described by the image forming apparatus shown in FIG. 1, wherein FIG. 6(a) shows a method of designating a storage location and a size of the image, and FIG. 6(b) shows an image that is displayed by the method shown in FIG. 6(a).

FIGS. 7(a) and 7(b) are explanatory views for describing a second description example of image placement information to be described by the image forming apparatus shown in FIG. 1, wherein FIG. 7(a) shows a method of designating a rotation angle of an image, and FIG. 7(b) shows an image that is displayed by the method shown in FIG. 7(a).

FIGS. 8(a) and 8(b) are explanatory views for describing a third description example of image placement information to be described by the image forming apparatus shown in FIG. 1, wherein FIG. 8(a) shows a method of designating an image trimming range, and FIG. 8(b) shows an image that is displayed by the method shown in FIG. 8(a).

FIGS. 9(a), 9(b) and 9(c) are explanatory views for describing a fourth description example of image placement information to be described by the image forming apparatus shown in FIG. 1, wherein FIGS. 9(a) and 9(b) show a method of designating an image flipping (i.e., inversion), and FIG. 9(c) shows an image that is displayed by the method shown in FIGS. 9(a) and 9(b).

FIGS. 10(a), 10(b) and 10(c) are explanatory views for describing a fifth description example of image placement information to be described by the image forming apparatus shown in FIG. 1, wherein FIGS. 10(a) and 10(b) show a method of designating to maintain an aspect ratio of an image, and FIG. 10(c) shows an image that is displayed by the method shown in FIGS. 10(a) and 10(b).

FIGS. 11(a) and 11(b) are explanatory views for describing a sixth description example of image placement information to be described by the image forming apparatus shown in FIG. 1, wherein FIG. 11(a) shows a method of designating all options for image placement, and FIG. 11(b) shows an image that is displayed by the method shown in FIG. 11(a).

FIG. 15 shows an example of SVG data that is stored in a file server.

DESCRIPTION OF THE PREFERRED EMBODIMENTS

An image forming apparatus in accordance with an embodiment of the present invention will be described in detail below with reference to the accompanying drawings.

An image forming apparatus in accordance with an embodiment of the present invention includes an image processing device. A preferred example of the image processing device includes a peripheral device that is capable of image processing, such as, for example, a digital camera, a scanner and a printer controller. Also, a preferred example of the image forming apparatus includes a printing apparatus, such as, for example, a printer, a copy machine, a scanner system, a facsimile, and a hybrid machine of the aforementioned devices.

Figure 1:
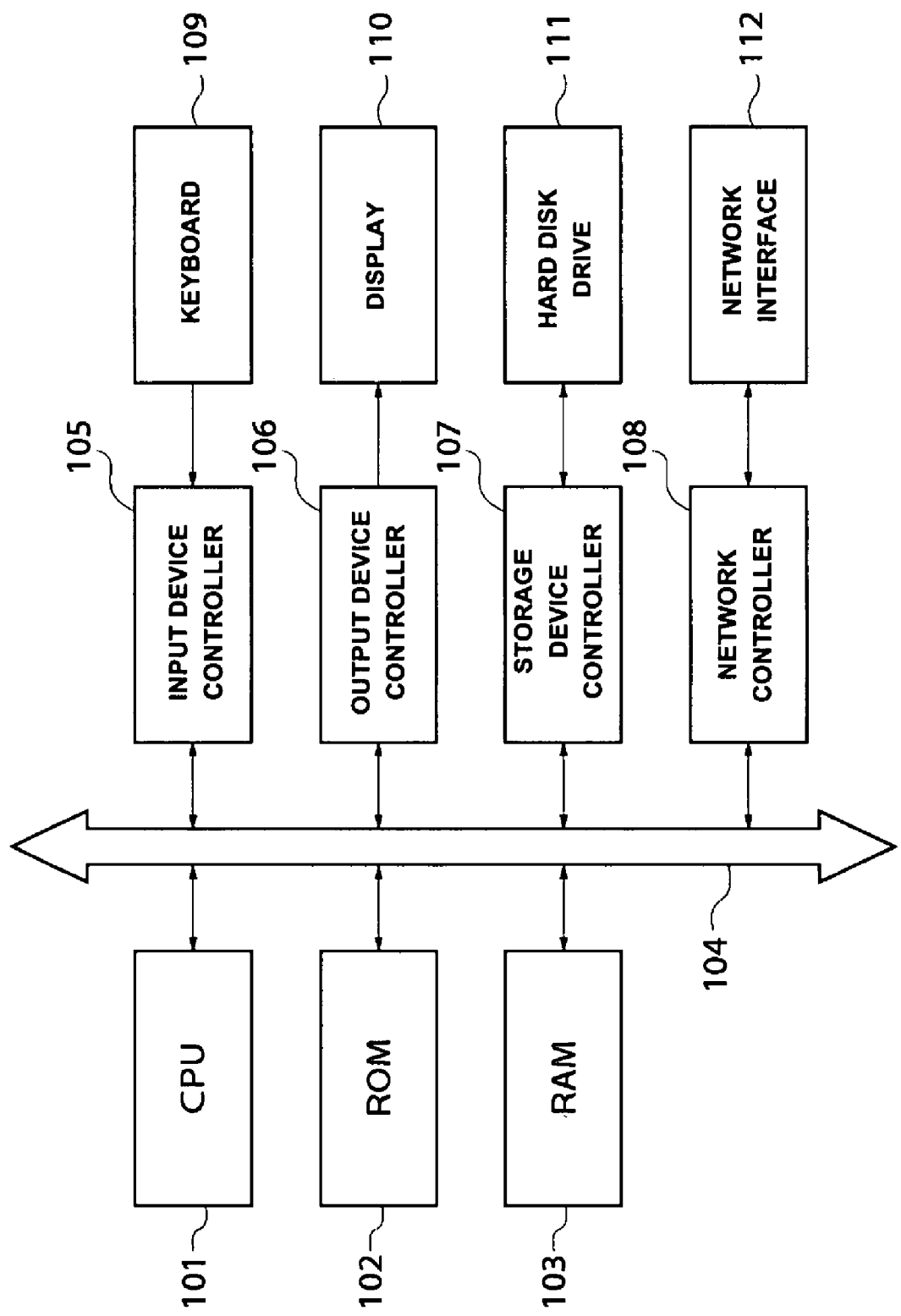
FIG. 1 shows a block diagram of a summary structure of an image forming apparatus in accordance with a first embodiment of the present invention.

FIG. 1 schematically shows a block diagram of a structure of an image forming apparatus in accordance with a first embodiment of the present invention.

Referring to FIG. 1, the image forming apparatus of the first embodiment is equipped mainly with a CPU 101, a ROM 102, a RAM 103, a keyboard 109, a display 110 and a hard disk drive 111. The keyboard 109, the display 110 and the hard disk drive 111 are connected to an input device controller 105, an output device controller 106 and a storage device controller 107, respectively. The CPU 101, the ROM 102, the RAM 103, the input device controller 105, the output device controller 106 and the storage device controller 107 are mutually connected through a system bus 104. The system bus 104 is connected to a network interface 112 through a network controller 108.

The CPU 101 performs overall controls and operation processings for the image forming apparatus. The ROM 102 stores programs that are necessary for operating the image forming system. The RAM 103 temporarily stores an image display program that uses an image placing method to be described below and data relating thereto.

The input device controller 105 controls operations of the keyboard 109, and transfers input data inputted by the keyboard 109 to the CPU 101 or the RAM 103. The output device controller 106 controls operations of the display 110, and displays screen drawing data stored in the RAM 103 on the display 110.

The hard disk drive 111 stores image display programs that use the image placing method to be described below and image data. The storage device controller 107 controls operations of the hard disk drive 111, and transfers data stored in the hard disk drive 111 to the CPU 101 or the RAM 103.

The network controller 108 is structured to control operations of the network interface 112, and to perform data communication with the network using TCP/IP protocol.

Next, an image display processing executed by the image forming apparatus indicated in FIG. 1 is described in detail with reference to the accompanying drawings.

The following description will be made mainly for an image display processing, but it is also applicable to an image printing processing.

Figure 2:
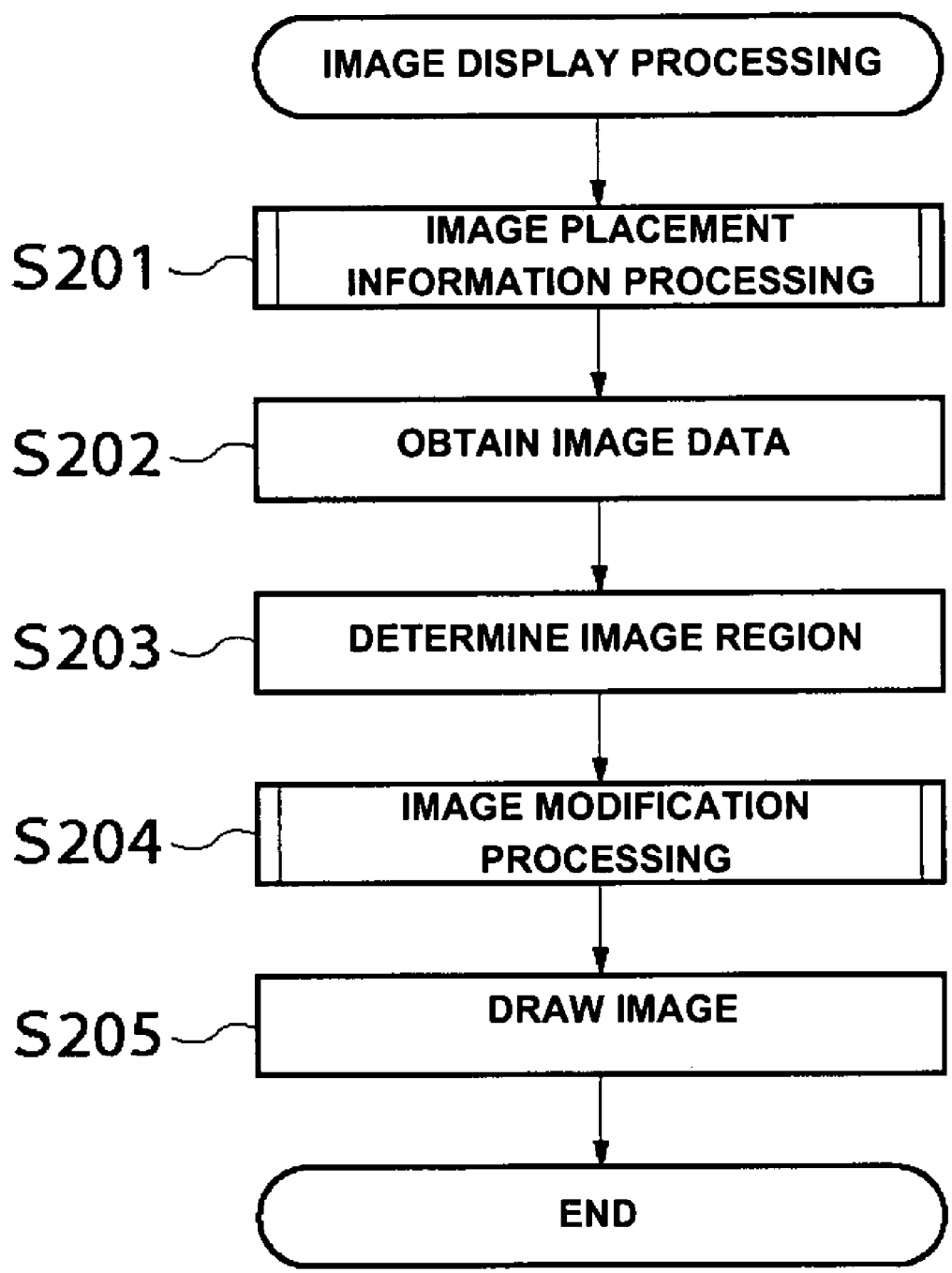
FIG. 2 shows a flow chart of an image display processing executed by the image forming apparatus shown in FIG. 1.

FIG. 2 shows a flow chart of an image display processing executed by the image forming apparatus indicated in FIG. 1.

In FIG. 2, first, an image placement information processing (to be described below with reference to FIG. 3) is executed (step S201), wherein image placement information described in a markup language, for example, an SVG (Scalable Vector Graphics), is interpreted, and image placement information for various attributes designated at a leading section of an image element interpreted is stored in the RAM 103. The attributes may include xlink:href attribute, width attribute, height attribute, ximage:rotate attribute, ximage:crop attribute, ximage:flip attribute and ximage:fit attribute.

Then, image data for an image is obtained by an image data obtaining module from a storage location designated by the xlink:href attribute, and stored in the RAM 103 (step S202). The storage location of the image data may be expressed by an URL (Uniform Resource Locator), which is a standard specification of an Internet resource identifier. Locations of files stored on a local file system or a network can be specified by URLs. If image data that is stored on a local file system (for example in the hard disk drive 111) is to be obtained, the storage device controller 107 is instructed to obtain the image data from the hard disk drive 111. If image data that is stored on a network is to be obtained, the network controller 108 is instructed to obtain the image data through the network interface 112 using the TCP/IP protocol.

Then, in step S203, according to the width and height designated by the width attribute and the height attribute, an image display rectangular region is determined by an image region determining module in a manner the image display rectangular region is placed in parallel with a vertical direction and a horizontal direction of the display 110. In step S204, image modification processings (to be described later with reference to FIG. 4) are executed on the image data obtained in step S202 by the image data obtaining module. For example, in the rotation angle modification processings, one or more contents designated by the rotation angle attribute (ximage:rotate attribute), trimming attribute (xiamge:crop attribute), flipping attribute (ximage:flip attribute), and aspect ratio (i.e., length and breadth ratio) maintaining attribute (ximage:fit) are rendered on the image data obtained. The image data is finally enlarged or reduced in size to fit in the display rectangular region that is determined by the image region determining module in step S203.

In step S205, the output device controller 106 is instructed to draw the image data that has been modified in step S204 on the display 110, and the image display processing is completed (step S205).

Based on the image placement information described in SVG, the image processing is conducted according to the processings in FIG. 2, and one of images indicated in FIGS. 6-11 (to be described below) is formed.

Figure 3:
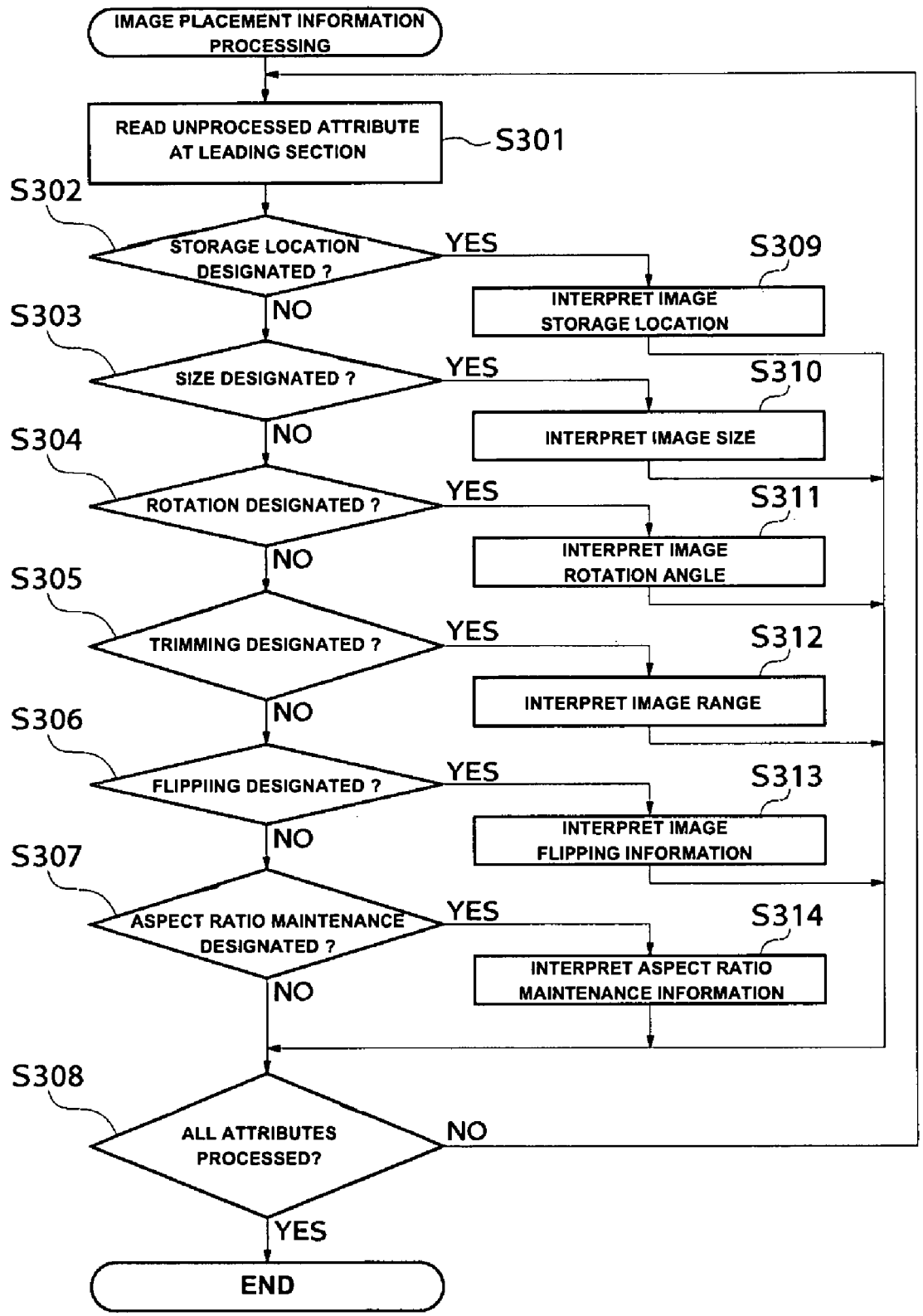
FIG. 3 shows a flow chart of an image placement information processing.
Figure 4:
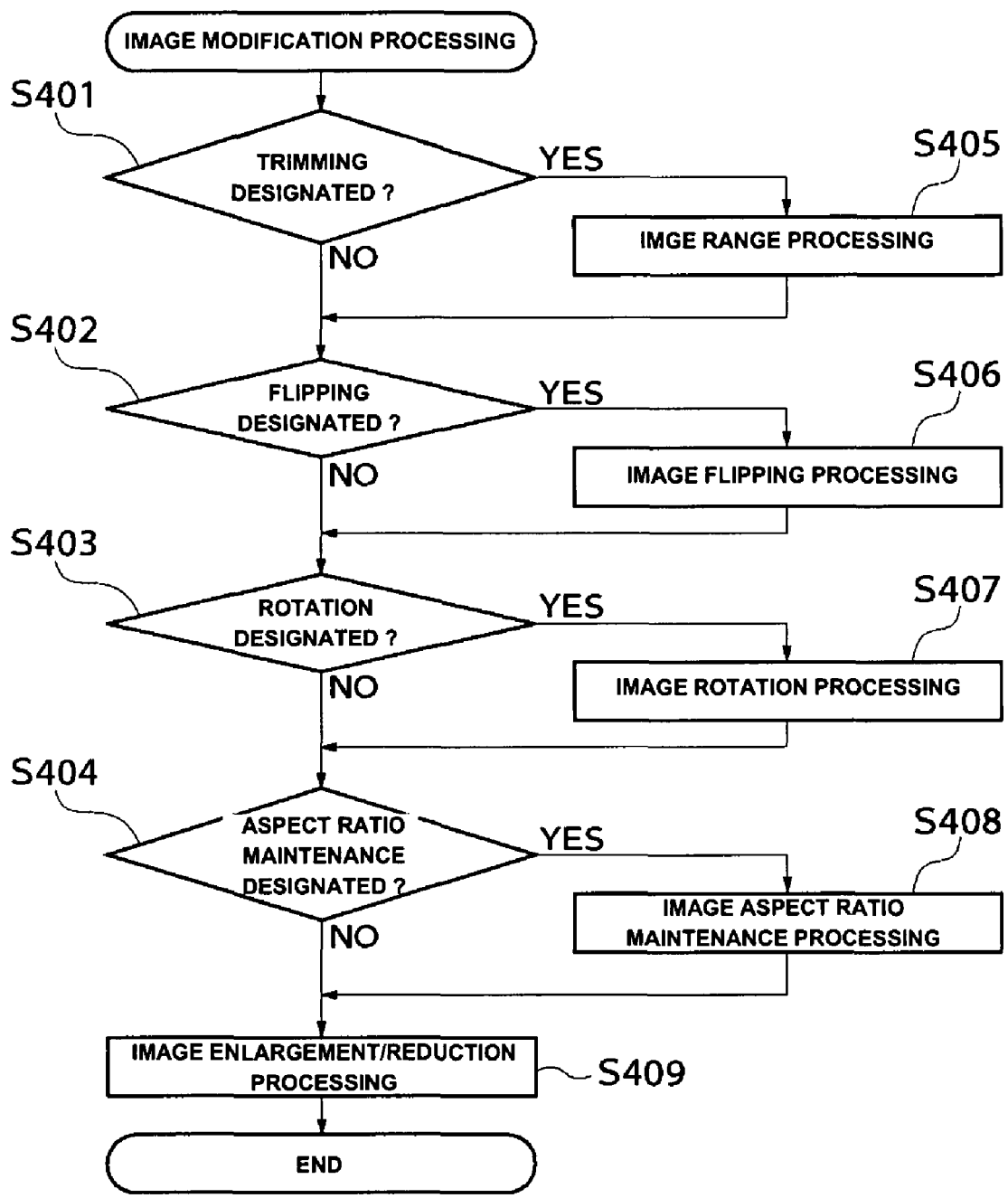
FIG. 4 shows a flow chart of image modification processing executed in step S204 in FIG. 2.

According to the processings shown in FIG. 2, image placement information including rotation angle information, trimming information, flipping information, and aspect ratio maintaining information that are described in a markup language such as SVG are interpreted (in an image placement information processing in step S201, and in FIG. 3), and modification processings are rendered on the image data according to the contents of the rotation angle information, trimming information, flipping information, and aspect ratio maintaining information interpreted (in an image modification processing in step S204, and in FIG. 4). As a result, processings such as rotation, trimming and the like to be rendered on an image can be designated in the descriptions of image placement information described in the markup language, and therefore the image can be described with a rich power of expression.

FIG. 3 shows a flow chart of an image placement information processing executed in step S201 indicated in FIG. 2.

Referring to FIG. 3, first, an attribute at a leading section of an image element is read (in step S301) by a reading module. A determination as to whether the attribute read is xlink:href reference, width attribute, height attribute, ximage:rotate attribute, ximage:crop attribute, ximage:flip attribute or ximage:fit attribute can be made in each of determinations in steps S302-S307 to be described below.

If the xlink:href attribute is recognized as a result of the determination in step S302, an image storage location interpretation processing is conducted in step S309 in which the attribute value is interpreted as a URL character string which is a standard specification of an Internet resource identifier, and a content thereof interpreted is stored in the RAM 103 as storage location designation information.

If the width attribute or the height attribute is recognized as a result of the determination in step S303, an image size interpretation processing is conducted in step S310, and the attribute value is interpreted as a numerical value indicative of a width of the image or a numerical value indicative of a height of the image, and a content thereof is stored in the RAM 103 as size designation information.

If the ximage:rotate attribute is recognized as a result of the determination in step S304, an image rotation interpretation processing is conducted in step S311, and the attribute value is interpreted as a numerical value indicative of a rotation angle of the image in the unit of degrees, and a content thereof is stored in the RAM 103 as rotation angle designation information.

If the ximage:crop attribute is recognized as a result of the determination in step S305, an image range interpretation processing is conducted in step S312, and the attribute value is interpreted as a character string composed of a numerical value indicative of a coordinate of a left side, a numerical value indicative of a coordinate of an upper side, a numerical value indicative of a width, and a numerical value indicative of a height of an image trimming rectangle, and a content thereof is stored in the RAM 103 as trimming designation information.

If the ximage:flip attribute is recognized as a result of the determination in step S306, an image flipping interpretation processing is conducted in step S313, and the attribute value is interpreted as a character string indicative of a flipping direction including a choice between a flipping in a horizontal direction and a flipping in the vertical direction, and a content thereof is stored in the RAM 103 as flipping designation information.

If the ximage:fit attribute is recognized as a result of the determination in step S307, an image aspect ratio maintaining interpretation processing is conducted in step S314, and the attribute value is interpreted as a character string indicative of an aspect ratio maintaining information including a choice as to where in a display region the image is to be arranged and disposed, and a choice as to whether a blank marginal portion is to be created in the display region, and a content thereof is stored in the RAM 103 as aspect ratio maintaining designation information.

In step S308, a determination is made as to whether or not all of the attributes of the image element have been processed. If there is any attribute remained unprocessed, the processings after step S301 are repeated. If all of the attributes have been processed, the image placement information processing is completed.

FIG. 4 shows a flow chart of the image modification processing that is executed in step S204 indicated in FIG. 2.

Referring to FIG. 4, in step S401, a determination is made as to whether or not the trimming designation information obtained in step S312 of FIG. 3 is stored. If the trimming designation information is stored, an image range processing is executed in step S405, in which a trimming processing is rendered on the image data according to the designated content, and the resultant image data is stored in the RAM 103.

In step S402, a determination is made as to whether or not the flipping designation information obtained in step S313 of FIG. 3 is stored. If the invention designation information is stored, an image flipping processing is executed in step S406, in which a flipping processing is rendered on the image data according to the designated content, and the resultant image data is stored in the RAM 103.

In step S403, a determination is made as to whether or not the rotation angle designation information obtained in step S311 of FIG. 3 is stored. If the rotation angle designation information is stored, an image rotation processing is executed in step S407, in which an image rotation processing is rendered on the image data according to the designated content, and the resultant image data is stored in the RAM 103.

In step S404, a determination is made as to whether or not the aspect ratio maintaining designation information obtained in step S314 of FIG. 3 is stored. If the aspect ratio maintaining designation information is stored, a aspect ratio maintaining processing is executed in step S408, in which an aspect ratio maintaining processing is rendered on the image data according to the designated content and an aspect ratio maintaining limit to be used for executing an image enlargement/reduction processing according to the designated content.

In step S409, the image data obtained through the processings in steps S405-S407 is enlarged or reduced in size to be contained in the display rectangular region that was determined in step S203 in FIG. 2. At this moment, if the aspect ratio maintaining limit was set in step S408, the image data is enlarged or reduced according to the breadth ratio maintaining limit.

The processings in steps S405-S409 are preferably executed in this order, such that, even if the order of descriptions of multiple attributes designated in an image element changes, the same image modification effects can be obtained.

The CPU101 can read plural commands at once. These commands can be described without defining the order of inputting the commands. The CPU101 preferably firstly selects a trimming command and lastly selects a rotating command from the commands read by the CPU101, regardless of the order of description by a user.

Figure 5:
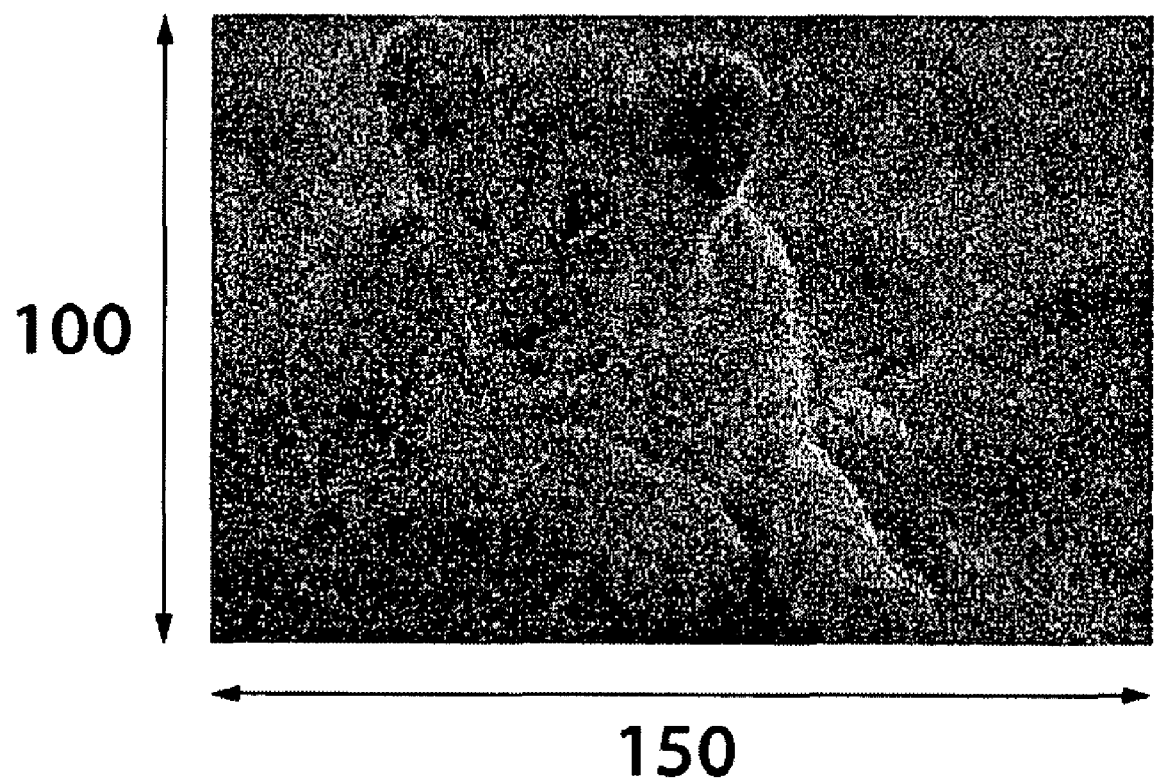
FIG. 5 shows an image in its original size and an aspect ratio (i.e., length and breadth ratio) of the image indicated therein, which corresponds to image placement information described by the image forming apparatus of FIG. 1.

Next, a description is made as to image placement information that is described by the image forming apparatus indicated in FIG. 1. As an example, image placement information are described by the image forming apparatus of FIG. 1, using an image element according to the SVG (Scalable Vector Graphics) standard specification. FIG. 5 shows an image in its original size with an aspect ratio thereof indicated, which corresponds to image placement information described by the image forming apparatus of FIG. 1.

FIGS. 6(a) and 6(b) are explanatory views in support of describing a first description example of image placement information to be described by the image forming apparatus shown in FIG. 1, wherein FIG. 6(a) shows a method of designating a storage location and a size of the image, and FIG. 6(b) shows an image that is displayed by the method shown in FIG. 6(a).

In FIG. 6(a), the storage location of the image data is designated by the xlink:href attribute having a value defined by a URL character string which is a standard specification of an Internet resource identifier, and the size of the image is designated by the width attribute having a numerical value indicating a width of the image and the height attribute having a numerical value indicating a height of the image. FIG. 6(b) shows an example of a display image that is obtained as a result of the image placement processing according to the placement information indicated in FIG. 6(a). Because the image is disposed in an enlarged or reduced state so that it is contained in the rectangular region that is determined by the designated width and height attributes, the original aspect ratio of the image may not be maintained, and the image may be deformed in a horizontal direction and/or a vertical direction and displayed like the display example shown in FIG. 6(b).

Figure 6:
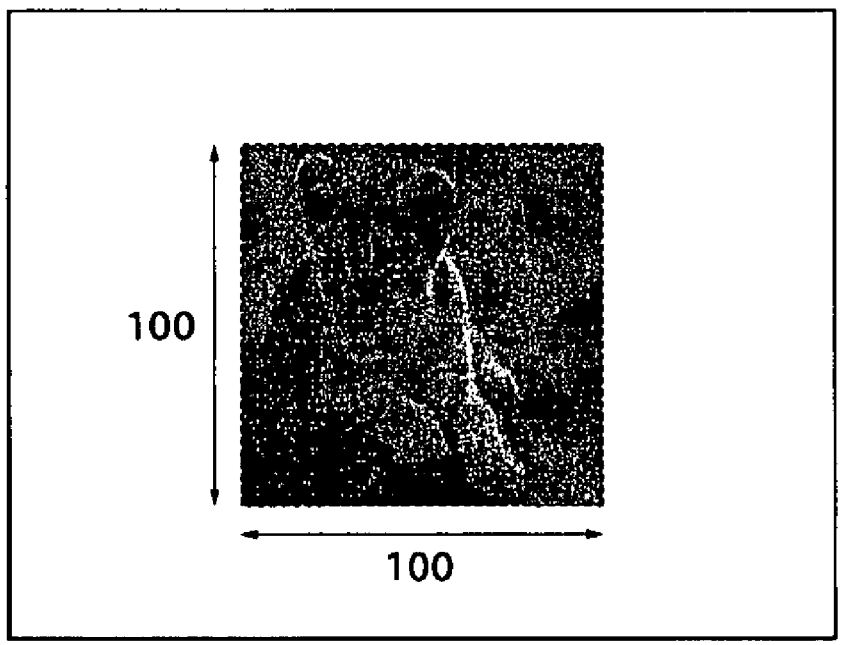

The image placing method that designates a storage location and size of an image like the description example of FIG. 6 is realized by using a markup language such as HTML.

In the following examples of description of image placement information, some of the effects obtained by the image placement designation options newly introduced by the present invention will be described.

FIGS. 7(a) and 7(b) are explanatory views in support for describing a second description example of image placement information to be described by the image forming apparatus shown in FIG. 1, wherein FIG. 7(a) shows a method of designating a rotation angle of an image, and FIG. 7(b) shows an image that is displayed by the method shown in FIG. 7(a).

Referring to FIG. 7(a), the rotation angle of the image is designated by the ximage:rotate attribute in the unit of degrees. FIG. 7(b) shows an example of a display image that is obtained as a result of the image placement processing according to the placement information indicated in FIG. 7(a). The image is rotated clockwise by the designated degrees, and enlarged or reduced so that the rotated image displayed is contained in the rectangular region that is determined by the designated width and height.

FIGS. 8(a) and 8(b) are explanatory views in support for describing a third description example of image placement information to be described by the image forming apparatus shown in FIG. 1, wherein FIG. 8(a) shows a method of designating an image trimming range, and FIG. 8(b) shows an image that is displayed by the method shown in FIG. 8(a).

Referring to FIG. 8(a), the trimming range of the image is designated by the ximage:crop attribute represented by a character string composed of a numerical value indicative of a coordinate of a left side, a numerical value indicative of a coordinate of an upper side, a numerical value indicative of a width, and a numerical value indicative of a height of an image trimming rectangle. FIG. 8(b) shows an example of a display image that is obtained as a result of the image placement processing according to the placement information indicated in FIG. 8(a). A region corresponding to a rectangular region designated against the entire image is defined as a trimming region, and the trimming region is enlarged or reduced so that the trimmed image displayed is contained in the rectangular region that is determined by the designated width and height. In this example, the trimmed rectangular shape of the image and the rectangular shape of the original image are both square, and therefore no distortion occurs.

FIGS. 9(a), 9(b) and 9(c) are explanatory views in support for describing a fourth description example of image placement information to be described by the image forming apparatus shown in FIG. 1, wherein FIGS. 9(a) and 9(b) show a method of designating an image flipping, and FIG. 9(c) shows an image that is displayed by the method shown in FIGS. 9(a) and 9(b).

Referring to FIG. 9(a), the rotation of the image is designated by the ximage:flip attribute represented by a character string indicative of a flipping direction including a choice between a flipping in a horizontal direction and a flipping in the vertical direction. Character strings that can be used as values of the ximage:flip attribute are indicated in FIG. 9(b). In this example, a character string "horizontal" is used to indicate that the image is to be flipped (i.e., inverted) in a horizontal direction. FIG. 9(c) shows an example of a display image that is obtained as a result of the image placement processing according to the placement information indicated in FIG. 9(a). The image is flipped in the designated direction, and enlarged or reduced so that the flipped image displayed is contained in the rectangular region that is determined by the designated width and height.

FIGS. 10(a), 10(b) and 10(c) are explanatory views in support for describing a fifth description example of image placement information to be described by the image forming apparatus shown in FIG. 1, wherein FIGS. 10(a) and 10(b) show a method of designating to maintain an aspect ratio of an image, and FIG. 10(c) shows an image that is displayed by the method shown in FIGS. 10(a) and 10(b).

Referring to FIG. 10(a), the maintenance of the aspect ratio of the image is designated by the ximage:fit attribute represented by a character string that expresses an aspect ratio to be maintained including a choice as to where in a display region the image is to be arranged and disposed, and a choice as to whether a blank marginal portion is to be created in the display region. Character strings that can be used as values of the ximage:fit attribute are indicated in FIG. 10(b). This example uses a character string "xMidYMid" indicating that a center of the image and a center of the display region be aligned and a character string "meet" indicating that a marginal blank region be displayed so that the entire image is displayed. FIG. 10(c) shows an example of a display image that is obtained as a result of the image placement processing according to the placement information indicated in FIG. 10(a). The image is enlarged or reduced while its aspect ratio being maintained when the image is enlarged or reduced so that it is contained in the rectangular region determined by the width and the height, and the image is processed with the marginal blank region according to the designation and displayed.

FIGS. 11(a) and 11(b) are explanatory views in support for describing a sixth description example of image placement information to be described by the image forming apparatus shown in FIG. 1, wherein FIG. 11(a) shows a method of designating all options for image placement, and FIG. 11(b) shows an image that is displayed by the method shown in FIG. 11(a).

Referring to FIG. 11(a), seven attributes including xlink:href attribute, with attribute, height attribute, ximage:rotate attribute, ximage:crop attribute, ximage:flip attribute and ximage:fit attribute are designated. FIG. 11(b) shows an example of a display image that is obtained as a result of the image placement processing according to the placement information indicated in FIG. 11(a). The image modification processings according to the designation of rotation angle, the designation of trimming range, the designation of flipping and the designation of aspect ratio maintenance in this order are rendered on the image to form a modified image, and then the modified image is enlarged or reduced in size so that it is contained in the rectangular region that is determined by the width and the height designated by the width and height attributes.

Next, an image forming apparatus in accordance with a second embodiment of the present invention will be described in detail with reference to the accompanying drawings. Operations of the image forming apparatus in accordance with the second embodiment of the present invention will be described, using a digital camera and a printer apparatus as an example of the image forming apparatus.

Figure 12:
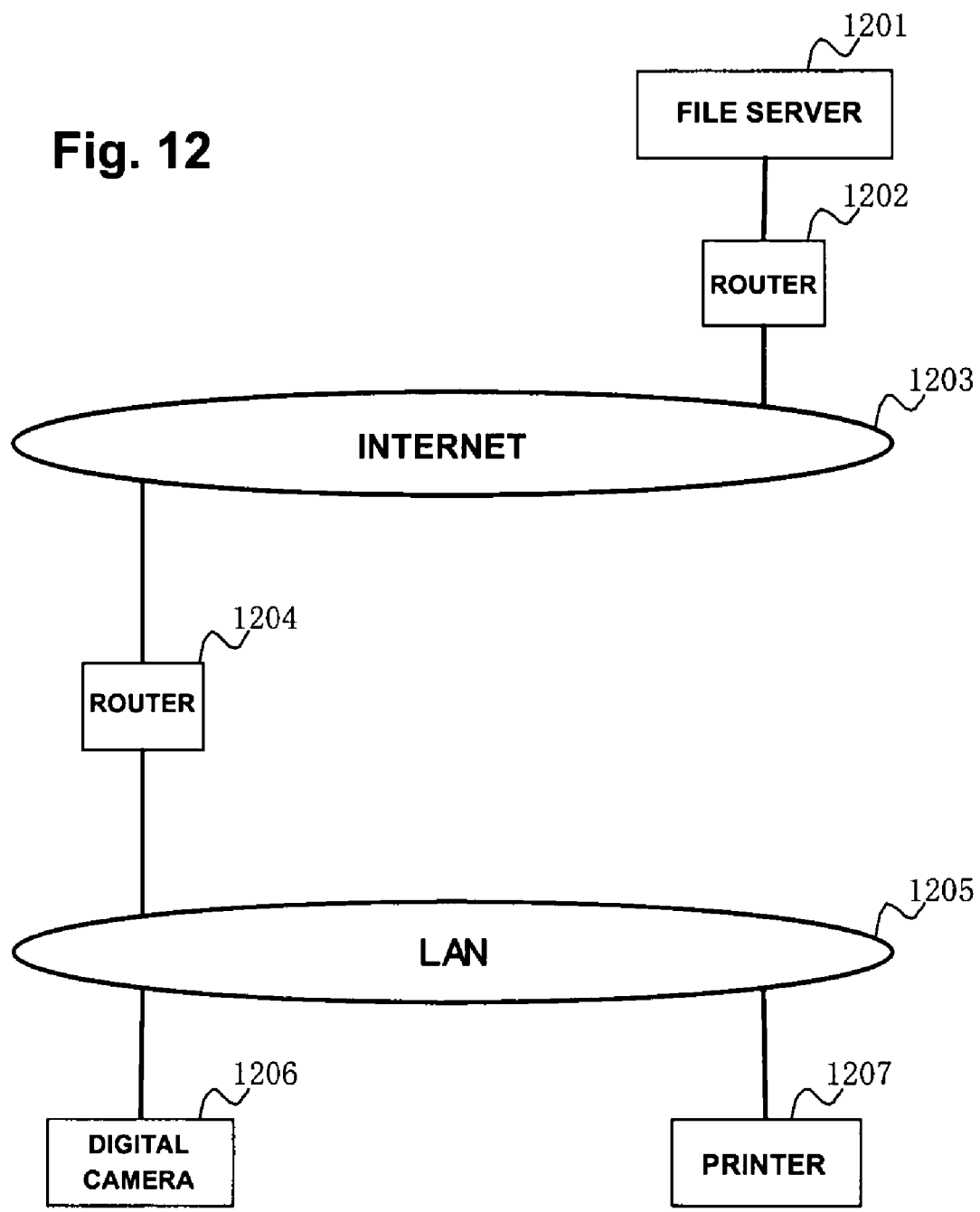
FIG. 12 schematically shows a structure of a system including an image forming apparatus in accordance with an embodiment of the present invention.

FIG. 12 schematically shows a structure of a system including an image forming apparatus in accordance with an embodiment of the present invention. The system includes a file server 1201 that is connected to the Internet 1203 through a router 1202. Also, a digital camera 1206 which is an image forming apparatus in accordance with an embodiment of the present invention and a printer 1207 which is also an image forming apparatus in accordance with an embodiment of the present invention are connected to a local area network (LAN) 1205. The Internet 1203 and the LAN 1205 are mutually connected through a router 1204. The file server 1201 stores files that describe SVG data that may be downloaded by the digital camera 1206.

Figure 13:
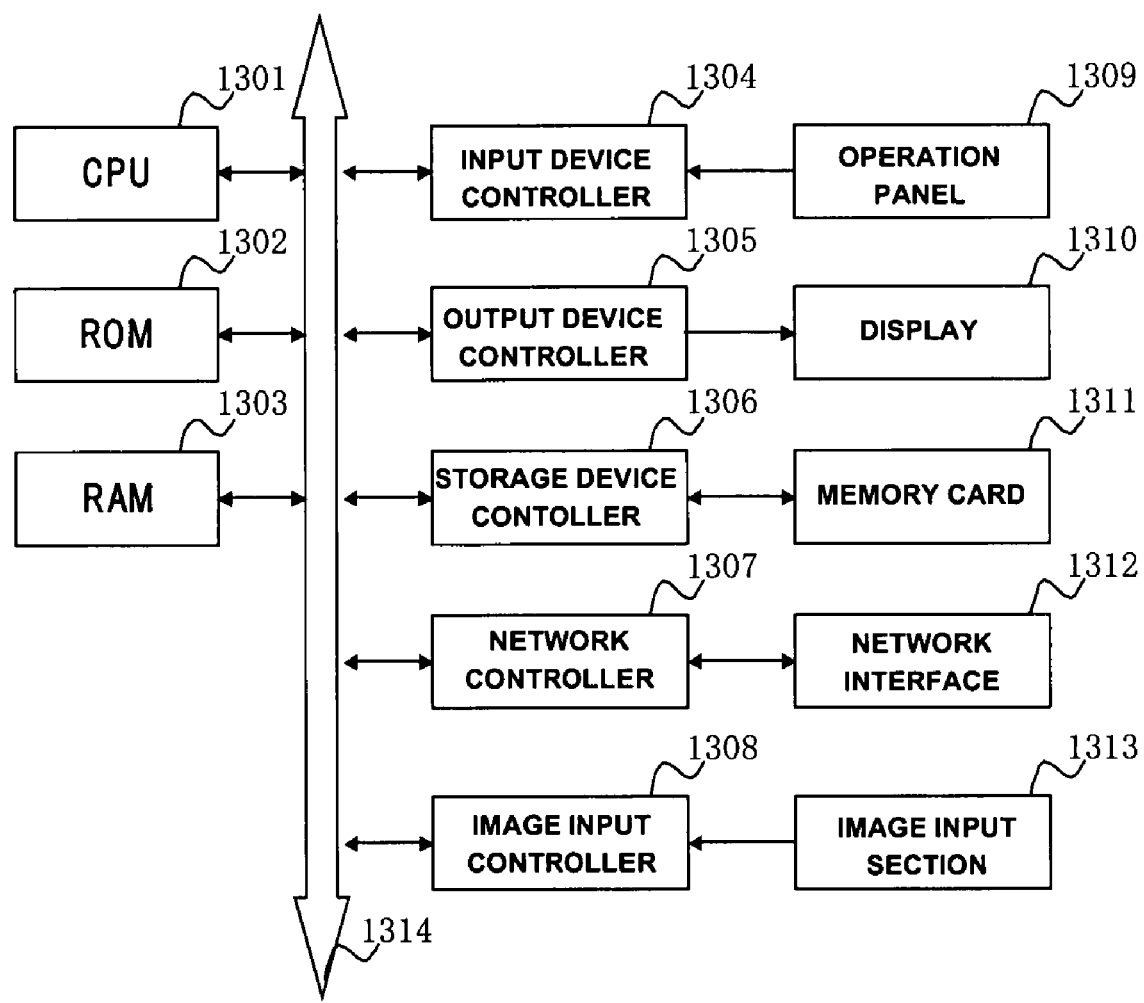
FIG. 13 schematically shows a block diagram of a structure of a digital camera in accordance with an embodiment of the present invention.

FIG. 13 schematically shows a block diagram of a structure of the digital camera 1206 in accordance with an embodiment of the present invention. The digital camera 1206 includes a CPU 1301 that is a system control section to control the overall operations of the digital camera. A ROM 1302 stores control programs for controlling the CPU and a variety of fixed data. A RAM 1303 may be composed of an SRAM, DRAM or the like, and stores program control variables and the like. Also, a variety of setting parameters and a variety of work buffers are stored in the RAM 1303. An input device controller 1304 controls an operation panel 1309. The operation panel 1309 may be made up of a keyboard of the like, and an operator performs a variety of operations through the operation panel 1309. An output device controller 1305 controls operations of a display 1310, and displays screen drawing data that is stored in and read from the RAM 1303 on the display 1310. A memory card 1311 stores SVG data that describes image placement information, digitally photographed image data and the like. A storage device controller 1306 controls writing and reading of data in and from the memory card 1311. A network controller 1307 controls operations of a network interface 1312, and is structured to perform data communications with the network using the TCP/IP protocol. An image input controller 1308 takes in images inputted from an image input section 1313, which may be digitally photographed image data, and transfer the image data to the RAM 1303 or the storage device controller 1306. The CPU 1301, the ROM 1302, the RAM 1303, the input device controller 1304, the output device controller 1305, the storage device controller 1306, the network controller 1307, the image input controller 1308 are mutually connected through a system bus 1314.

Figure 14:
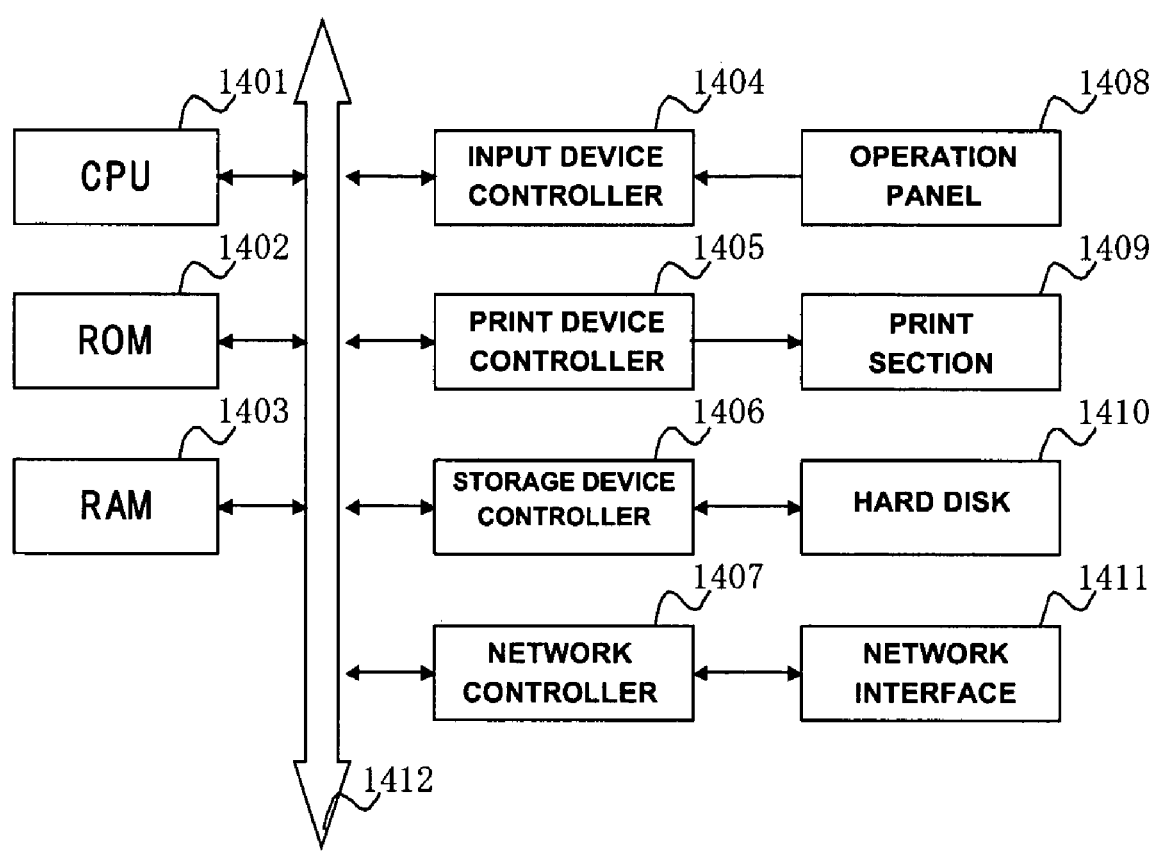
FIG. 14 schematically shows a block diagram of a structure of a printer apparatus in accordance with an embodiment of the present invention.

FIG. 14 schematically shows a block diagram of a structure of a printer apparatus 1207 in accordance with an embodiment of the present invention.

The printer apparatus 1207 includes a CPU 1401 that is a system control section to control the overall operations of the printer apparatus. A ROM 1402 stores control programs for controlling the CPU and a variety of fixed data. A RAM 1403 may be composed of an SRAM, DRAM or the like, and stores program control variables and the like. Also, a variety of setting parameters and a variety of work buffers are stored in the RAM 1403. An input device controller 1404 controls an operation panel 1408. The operation panel 1408 may be made up of a keyboard of the like, and an operator performs a variety of operations through the operation panel 1408. A print device controller 1405 controls operations of a printing section 1409, and prints image drawing data that is stored in and read from the RAM 1403 on paper sheets. A hard disk 1410 stores SVG data that describes image placement information, print data that may be transferred from other devices and the like. A storage device controller 1406 controls writing and reading of data in and from the hard disk 1410. A network controller 1407 controls operations of a network interface 1411, and is structured to perform data communications with the network using the TCP/IP protocol. The CPU 1401, the ROM 1402, the RAM 1403, the input device controller 1404, the print device controller 1405, the storage device controller 1406, and the network controller 1407 are mutually connected through a system bus 1412.

The system in accordance with the present embodiment stores a plurality of SVG data in the file server 1201. The SVG data describe processing information for processing image data. FIG. 15 shows an example of SVG data that is stored in the file server 1201.

A processing flow of the present system will be described below.

First, an operator operates the operation panel 1309 of the digital camera 1206 to download SVG data stored in the file server 1201 through the LAN 1205. The SVG data downloaded is temporarily stored in the RAM 1303. Next, in response to an operation of the operation panel 1309 by the operator, the downloaded SVG data and image data (e.g., photograph image data) are combined to create new SVG data within the digital camera 1206, and the new SVG data is stored in the memory card 1311 of the digital camera 1206.

For example, when the operator downloads SVG data indicated in FIG. 15, the SVG data is combined with a file name of the photograph image to create SVG data indicated in FIG. 7(a), and stored together with the photograph image in the memory card 1311. Based on the newly created SVG data and the photograph image, the CPU 1301 executes the processings indicated in FIGS. 2, 3 and 4, such that an image indicated in FIG. 7(b) is displayed on the display 1310 of the digital camera 1206.

In response to an operation by the operator of the operation panel 1309 of the digital camera 1206, the newly created SVG data and the photograph image data are sent to the printer 1207 through the LAN 1205. The printer 1207 temporarily stores the SVG data and the photograph image data in the hard disk 1410. At the printer 1207, the CPU 1401 executes the processings indicated in FIGS. 2, 3 and 4 based on the data stored in the hard disk 1410. As a result, an image indicated in FIG. 7(b) is printed by the print section 1409.

Figure 7:
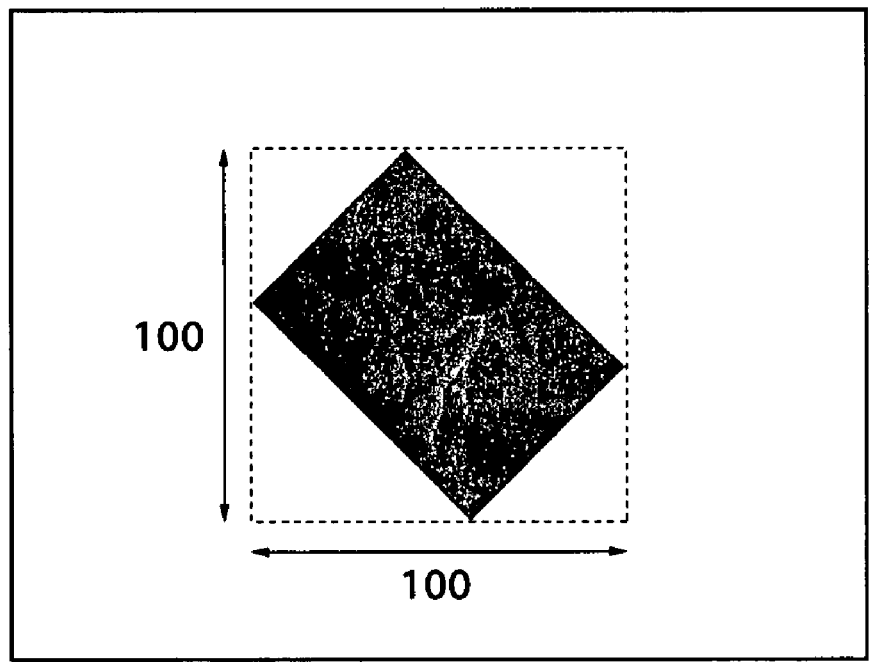
Figure 8:
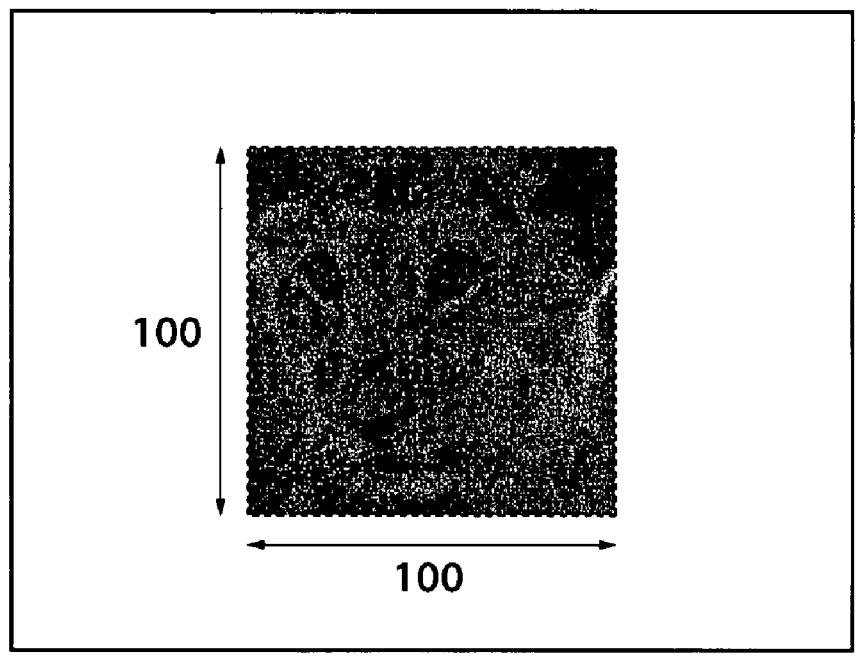
Figure 9:
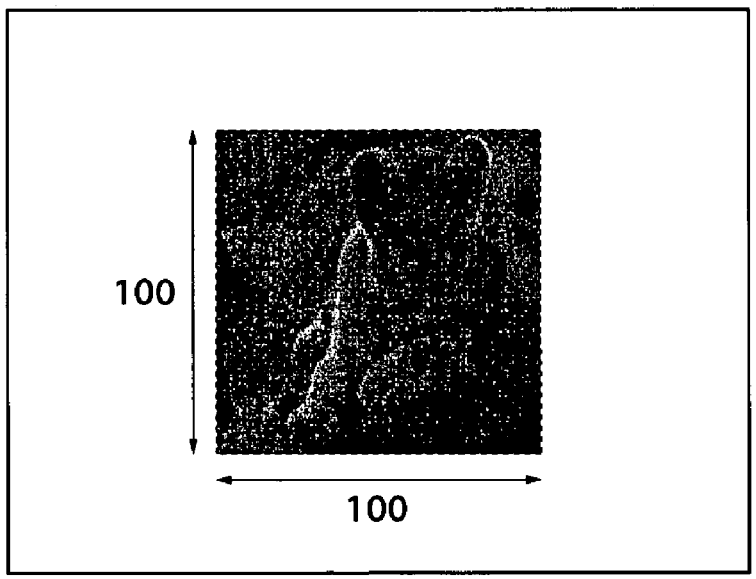
Figure 11:
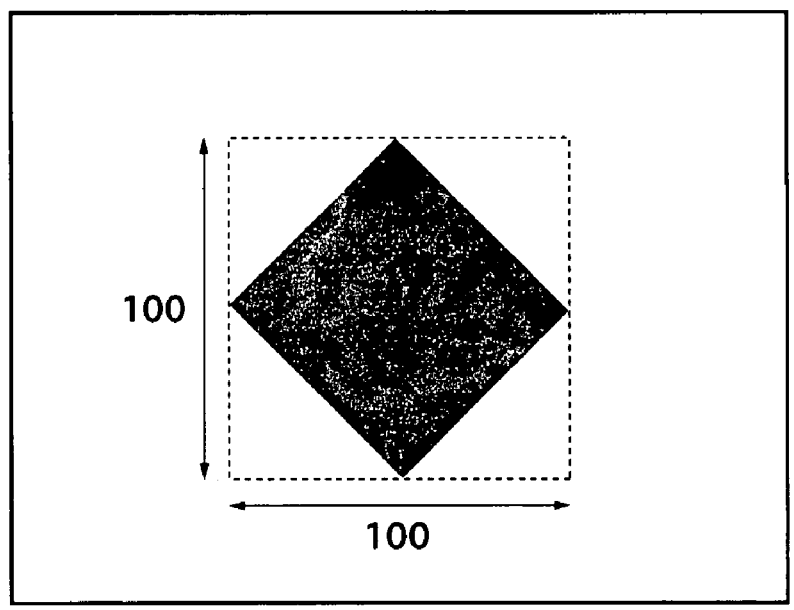

The example of the SVG data indicated in FIG. 15 and FIG. 7 shows a case where rotation of an image is designated. However, when downloaded SVG data contains any of the trimming designation, flipping designation and designation of aspect ratio maintaining designation, similar processings are performed in the digital camera 1206 and the printer 1207, and the image data is displayed on the display 1310 and printed by the print section 1409 according to the designations contained in the SVG data.

The processings performed by the digital camera 1206 and the printer 1207 may be essentially the same as those described above with reference to FIGS. 2, 3 and 4, and therefore their detailed description is omitted. The processings performed by the digital camera 1206 and the printer 1207 will be described below in conjunction with the structures thereof in accordance with the second embodiment.

At the digital camera 1206, the CPU 1301 reads SVG data stored in the memory card 1311 via the storage device controller 1306, and executes the image placement information processing (step S201). Then, the CPU 1301 reads image data that is stored in the memory card 1311 via the storage device controller 1306 (step S202), determines an image region (step S203), and performs the image modification processing (step S204), to thereby create image drawing data. The image drawing data thus created is stored in the RAM 1303, and the CPU 1301 controls the output device controller 1305 to draw an image on the display 1310 (step S205). The processings indicated in FIGS. 3 and 4 at the digital camera 1206 are executed based on the programs stored in the ROM 1302 entirely by the CPU 1301.

At the printer 1207, the CPU 1401 reads SVG data stored in the hard disk 1410 via the storage device controller 1406, and executes the image placement information processing (step S201). Then, the CPU 1401 reads image data stored in the hard disk 1410 via the storage device controller 1406 (step S202), determines an image region (step S203), and performs the image modification processing (step S204), to thereby create image drawing data. The created image drawing data is stored in the RAM 1403, the CPU 1401 controls the print device controller 1405 such that the print section 1409 prints an image on a paper sheet (step S205). The processings indicated in FIGS. 3 and 4 at the printer 1207 are executed based on the programs stored in the ROM 1402 entirely by the CPU 1401.

The description examples and display image examples indicated in FIGS. 5 through 11 are also similarly applicable to the second embodiment. Since these examples are described in the first embodiment, their description is omitted.

In the system in accordance with the second embodiment described above, the digital camera 1206 downloads SVG data from the file server 1201, and the processed SVG data is sent to the printer 1207. However, SVG data may be stored in advance in any of the ROM 1302, the RAM 1303 and the memory card 1311 of the digital camera 1206. Similarly, in the printer 1207, SVG data may be stored in advance in any of the ROM 1402, the RAM 1403 and the hard disk 1410. Also, the operation panel 1309 of the digital camera 1206 and/or the operation panel 1408 of the printer 1207 may be structured to allow an operator to create and edit SVG data.

In the embodiments described above, digital cameras and printer apparatuses are mainly described as examples. However, the present invention is not limited to these embodiments, and is also similarly applicable to other devices such as copiers, scanner systems, facsimile machines, camcorders, and hybrid apparatuses of the aforementioned devices, as well as to device controllers in information processing devices such as computers.

As described above, in accordance with one aspect of the present invention, placement information for image rotation, trimming and the like that is described in a descriptive language is interpreted, and modification processings are rendered on image data based on contents of the interpreted placement information. As a result, the placement of an image can be designated in descriptions of placement information such as rotation of the image, trimming of the image and the like in a descriptive language, and therefore the image can be drawn with a rich power of expression.

Also, when an XML (Extensible Markup Language) standard specification is used for expressing image placement information, the image placement information can be edited by using a general-purpose tool or text editor that is compatible with the XML, and therefore the work load in creating image placement information can be alleviated.

Furthermore, when an XHTML (Extensible Hyper Text Markup Language) standard specification is used for expressing image placement information of an image, an ordinary internet browser can be used to display the image, and therefore the convenience in viewing the image can be improved.

Also, by processing an image in a predetermined processing order, for example, in the order of processings in steps S301-S307 indicated in FIG. 3 in which a size processing, a rotation processing and a trimming designation processing are rendered on the image in this order, appropriate image processing effects can be attained without a defect in the image such as a chipping in the image.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An image forming apparatus that processes data described in a predetermined descriptive language, the apparatus comprising:
    an image storage location interpreting module that interprets a storage location of image data of an image described according to the predetermined descriptive language;
    an image data obtaining module that obtains the image data based on the storage location of the image data interpreted by the image storage location interpreting module;
    a reading module that reads and obtains image forming information of the image from the data described in the predetermined descriptive language which includes XML or HTML and in which no description order is defined for commands included in the image forming information;
    an image forming information interpreting module that interprets the image forming information obtained by the reading module; and
    an image forming processing module that renders an image forming processing on the image data based on the image forming information interpreted by the image forming information interpreting module,
    wherein the image forming information includes a trimming command,
    wherein the image forming information interpreting module includes a trimming command interpreting module that interprets the obtained trimming command,
    wherein the image forming processing module includes a trimming processing module that renders a trimming processing on the image data based on the interpreted trimming command, and wherein the image forming information interpreting module includes a trimming command detection module that detects a trimming command, a command detection module that detects a command other than the trimming command wherein the other command includes any of a flipping processing command, a rotation processing command, and an image aspect ratio maintaining processing command, and a control module that controls processing such that the trimming command detected by the trimming command detection module is executed prior to execution of the other command detected by the command detection module.

2. An image forming apparatus according to claim 1, wherein the image trimming information is composed of a numerical value indicative of a coordinate of a left side of the image data, a numerical value indicative of a coordinate of an upper side of the image data, a numerical value indicative of a width of the image data, and a numerical value indicative of a height of the image data.

3. An image forming apparatus according to claim 1, wherein the image forming information includes image flipping information, the image forming information interpreting module includes an image flipping information interpreting module that interprets the image flipping information obtained, and the image forming processing module includes an image flipping processing module that renders an image flipping processing on the image data based on the image flipping information interpreted.

4. An image forming apparatus according to claim 3, wherein the image flipping information includes a character string representative of a flipping about one of a horizontal axis and a vertical axis.

5. An image forming apparatus according to claim 1, wherein the image forming information includes image rotation angle, the image forming information interpreting module includes an image rotation angle interpreting module that interprets the image rotation angle obtained, and the image forming processing module includes an image rotation processing module that renders an image rotation processing on the image data based on the image rotation angle interpreted.

6. An image forming apparatus according to claim 5, wherein the image rotation angle is expressed in units of degrees.

7. An image forming apparatus according to claim 1, wherein the image forming information includes image aspect ratio maintaining information, the image forming information interpreting module includes an image aspect ratio maintaining information interpreting module that interprets the aspect ratio maintaining information obtained, and the image forming processing module includes an image aspect ratio maintaining processing module that renders an image aspect ratio maintaining processing on the image data based on the image aspect ratio maintaining information interpreted.

8. An image forming apparatus according to claim 7, wherein the image aspect ratio maintaining information is composed of a character string including positional information indicative of where the image data is arranged in the rectangular image forming region and selection information indicative of whether or not a margin blank area is to be created in the rectangular image forming region.

9. An image forming apparatus according to claim 1, wherein the descriptive language is an XML (Extensible Markup Language) standard specification.

10. An image forming apparatus according to claim 9, wherein the descriptive language is an SVG (Scalable Vector Graphics) standard specification.

11. An image forming apparatus according to claim 9, wherein the descriptive language is an XHTML (Extensible Hyper Text Markup Language) standard specification.

12. An image forming apparatus according to claim 1, comprising a printing apparatus.

13. An image forming apparatus according to claim 1, comprising a printing apparatus.

14. An image forming method that processes data described in a predetermined language, the image forming method comprising:

an image storage location interpreting step of interpreting a storage location of image data of an image described according to the predetermined descriptive language;

an image data obtaining step of obtaining the image data based on the storage location of the image data interpreted in the image storage location interpreting step;

a reading step of reading and obtaining image forming information of the image from the data described in the predetermined descriptive language which includes XML or HTML and in which no description order is defined for commands included in the image forming information;

an image forming information interpreting step of interpreting the image forming information obtained in the reading step; and an image forming processing step of rendering an image forming processing on the image data based on the image forming information interpreted in the image forming information interpreting step, wherein the image forming information includes a trimming command, wherein the image forming information interpreting step includes a trimming command interpreting step of interpreting the obtained trimming command, wherein the image forming processing step includes a trimming processing step of rendering a trimming processing on the image data based on the interpreted trimming command, and wherein the image forming information interpreting step includes a trimming command detection step that detects a trimming command, a command detection step that detects a command other than the trimming command wherein the other command includes any of a flipping processing command, a rotation processing command, and an image aspect ratio maintaining processing command, and a control step that controls processing such that the trimming command detected in the trimming command detection step is executed prior to execution of the other command detected in the command detection step.

15. An image forming method according to claim 14, wherein the image trimming information is composed of a numerical value indicative of a coordinate of a left side of the image data, a numerical value indicative of a coordinate of an upper side of the image data, a numerical value indicative of a width of the image data, and a numerical value indicative of a height of the image data.

16. An image forming method according to claim 14 wherein the image forming information includes image flipping information, the image forming interpreting step includes an image flipping information interpreting step that interprets the image flipping information obtained, and the image forming processing step includes an image flipping processing step that renders an image flipping processing on the image data based on the image flipping information interpreted.

17. An image forming method according to claim 16, wherein the image flipping information includes a character string representative of a flipping about one of a horizontal axis and a vertical axis.

18. An image forming method according to claim 14, wherein the image forming information includes image rotation angle, the image forming information interpreting step includes an image rotation angle interpreting step that interprets the image rotation angle obtained, and the image forming processing step includes an image rotation processing step that renders an image rotation processing on the image data based on the image rotation angle interpreted.

19. An image forming method according to claim 18, wherein the image rotation angle is expressed in units of degrees.

20. An image forming apparatus according to claim 14, wherein the image forming information includes image aspect ratio maintaining information, the image forming information interpreting step includes an image aspect ratio maintaining information interpreting step that interprets the image aspect ratio maintaining information obtained, and the image forming processing step includes an image aspect ratio maintaining processing step that renders an image aspect ratio maintaining processing on the image data based on the image aspect ratio maintaining information interpreted.

21. An image forming method according to claim 20, wherein the image aspect ratio maintaining information is composed of a character string including positional information indicative of where the image data is arranged in the rectangular image forming region and selection information indicative of whether or not a margin blank area is to be created in the rectangular image forming region.

22. An image forming method according to claim 14, wherein the descriptive language is an XML (Extensible Markup Language) standard specification.

23. An image forming method according to claim 22, wherein the descriptive language is an SVG (Scalable Vector Graphics) standard specification.

24. An image forming method according to claim 22, wherein the descriptive language is an XHTML (Extensible Hyper Text Markup Language) standard specification.

25. An image forming method according to claim 14, comprising an image processing method.

26. An image forming method according to claim 14, comprising a printing method.

27. A computer readable storage medium that stores an image forming program that makes a computer to execute an image forming method that processes data described in a predetermined description language, the computer readable storage medium comprising:
   an image storage location interpreting step of interpreting a storage location of image data of an image described according to the predetermined descriptive language;
   an image data obtaining step of obtaining the image data based on the storage location of the image data interpreted in the image storage location interpreting step;
   a reading step of reading and obtaining image forming information of the image from the data described in the predetermined descriptive language which includes XML or HTML and in which no description order is defined for commands included in the image forming information;
   an image forming information interpreting step of interpreting the image forming information obtained in the reading step; and
   an image forming processing step of rendering an image forming processing on the image data based on the image forming information interpreted in the image forming information interpreting step,
   wherein the image forming information includes a trimming command,
   wherein the image forming information interpreting step includes a trimming command interpreting step of interpreting the obtained trimming command,
   wherein the image forming processing step includes a trimming processing step of rendering a trimming processing on the image data based on the interpreted trimming command, and
   wherein the image forming information interpreting step includes a trimming command detection step that detects a trimming command, a command detection step that detects a command other than the trimming command wherein the other command includes any of a flipping processing command, a rotation processing command, and an image aspect ratio maintaining processing command, and a control step that controls processing such that the trimming command detected in the trimming command detection step is executed prior to execution of the other command detected in the command detection step.

* * * * *

UNITED STATES PATENT AND TRADEMARK OFFICE
CERTIFICATE OF CORRECTION

PATENT NO.        : 7,394,563 B2
APPLICATION NO.   : 10/602119
DATED             : July 1, 2008
INVENTOR(S)       : Jun Fujisawa et al.

It is certified that error appears in the above-identified patent and that said Letters Patent is hereby corrected as shown below:

IN THE DRAWINGS:
Sheet 3, Figure 3, "FLIPPIING" should read --FLIPPING--.
Sheet 4, Figure 4, "IMGE" should read --IMAGE--.
Sheet 13, Figure 13, "CONTOLLER" should read --CONTROLLER--.

COLUMN 2:
Line 11, "included" should read --included is--.

COLUMN 4:
Line 50, "(xiamge:crop" should read --(ximage:crop--.

COLUMN 6:
Line 37, "a aspect" should read --an aspect--.

COLUMN 8:
Line 51, "being maintained" should read --is maintained--.
Line 64, "with attribute," should read --width attribute--.

COLUMN 9:
Line 42, "of the like" should read --or the like--.
Line 56, "transfer" should read --transfers--.

COLUMN 10:
Line 8, "of the like" should read --or the like--.

UNITED STATES PATENT AND TRADEMARK OFFICE
CERTIFICATE OF CORRECTION

PATENT NO.       : 7,394,563 B2
APPLICATION NO.  : 10/602119
DATED            : July 1, 2008
INVENTOR(S)      : Jun Fujisawa et al.

It is certified that error appears in the above-identified patent and that said Letters Patent is hereby corrected as shown below:

COLUMN 14:
Line 5, "a printing apparatus" should read --an image processing apparatus--.
Line 59, "claim 14" should read --claim 14,--.
Line 61, "forming" should read --forming information--.

Signed and Sealed this

Twenty-fourth Day of February, 2009

JOHN DOLL
*Acting Director of the United States Patent and Trademark Office*